Dec. 4, 1934.   A. D. GERKING   1,982,801
INTERCHANGEABLE BATTERY CELL
Filed March 20, 1933
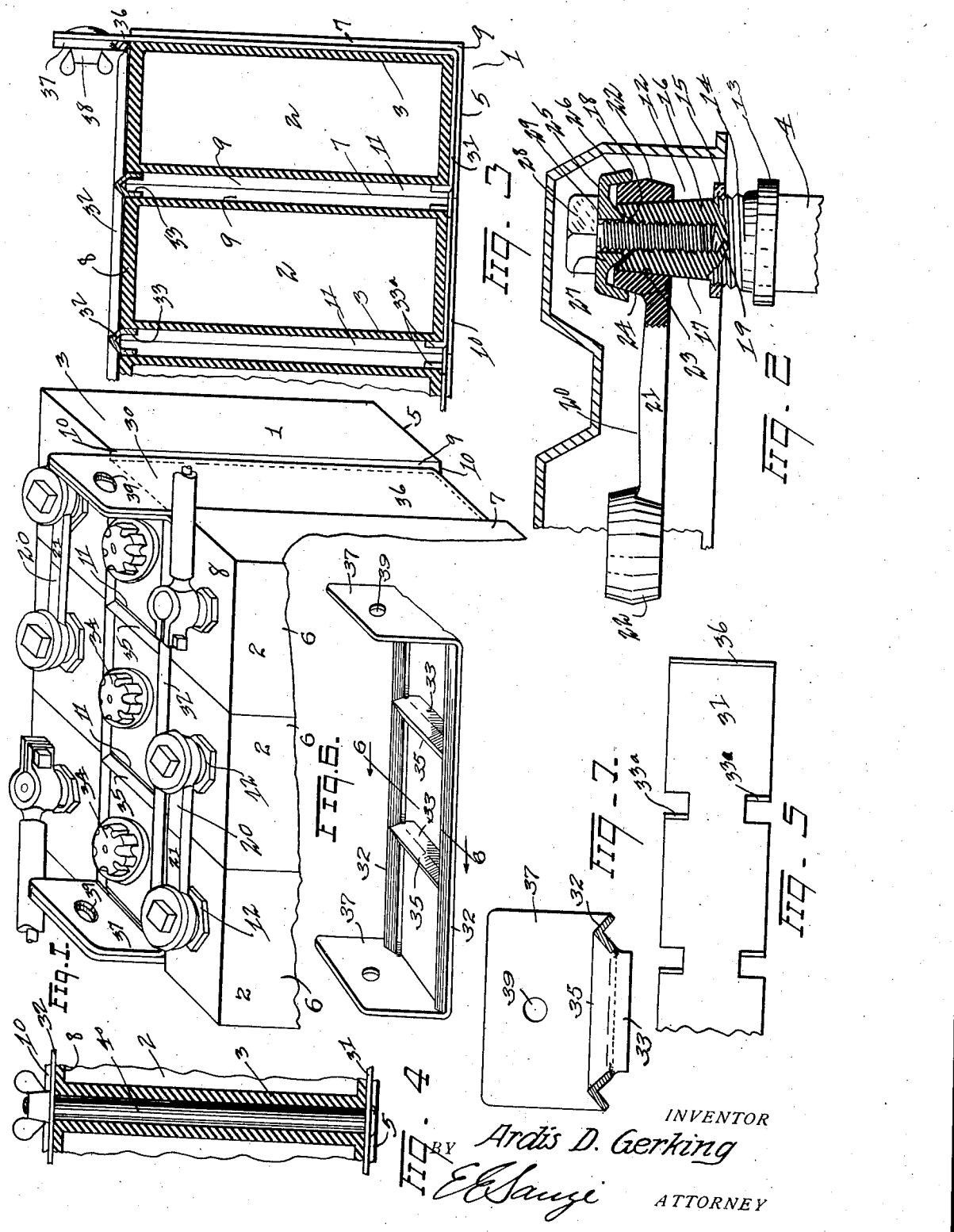
INVENTOR
BY Ardis D. Gerking
ATTORNEY Patented Dec. 4, 1934

1,982,801

UNITED STATES PATENT OFFICE 1,982,801

INTERCHANGEABLE BATTERY CELL

Ardis D. Gerking, Freewater, Oreg.

Application March 20, 1933, Serial No. 661,751

3 Claims. (Cl. 136—166)

This invention relates to interchangeable battery is ready for its intended use.

a battery cell that is interchangeable with like cells.

Another object of the invention is to provide a battery cell that may be removably connected with other cells to form a battery.

A further object of the invention is to provide a battery cell that may be removed from a battery of such cells without disturbing the battery.

A further object of the invention is to provide a battery cell that is interchangeable with other cells of a battery and providing a connector therefor that will be readily removable from adjacent cells.

A further object of the invention is to provide a cell that is capable of addition to other cells whereby to provide a battery of desired voltage within reasonable electrical limits.

With these and other objects of the invention in view reference is now had to the accompanying drawing in which Fig. 1 is a perspective view of a plurality of assembled battery cells arranged to form a battery;

Fig. 2 is a detail showing construction of a detachable electric connector for the cells and a cover therefor;

Fig. 3 shows a fragment of the mechanical connector partly in section;

Fig. 4 shows a detail of my preferred form of mechanical connector;

Fig. 5 is a plan view of a fragment of the bottom strap of the mechanical connector;

Fig. 6 is a perspective view of the top strap of the mechanical connector; and

Fig. 7 is a cross section of the top strap taken on the line 6—6 of Fig. 6.

Having reference to the drawing like numerals refer to like parts throughout the several views and the numeral 1 refers to a battery formed from interchangeable cells 2 which forms the subject of this invention.

This invention pertains more particularly to the form of the case 3 of the cell 2 and the secure assembly of cells to form the said battey 1, and for that reason the contents that goes to complete a cell, such as the plates, spreaders, electrolyte, etc., are not shown in the drawing as they are well known in the art, and as they have no particular bearing on the invention.

There will be one exception however to the above in that the part 4 which forms a part of one set of the included plates will be termed the "plates"

With this explanation the case 3 will consist of the usual hard rubber, or other suitable material, and may be of the usual rectangular form, and for the benefit of this invention will consist of a bottom 5, ends 6, sides 7 (one only of which is shown), and a top 8.

Encircling the case and formed therewith is a recessed channel formed by offsets 9 in the walls of the bottom, sides and top, and the channel formed in the bottom and top will be termed the aligned channel 10 as these channels will be continuous throughout the length of the battery (or assembled cells), and that formed in the sides will be termed the connecting channels 11, these being in communication with the aligned channels 10 and preferably perpendicular thereto, and which by their position on the case 3 will register with similar channels of adjacent cells 2.

The purpose of these offsets and the channels formed thereby will be presently explained.

Attached to the plates 4 and extended through the top 8 of the case, one at each end thereof, is a terminal 12, and the several included parts thereof consist of the usual shoulder 13, a threaded portion 14 and locknut 15 disposed to secure the terminal 12 to the material forming the top, and the post 16 itself is provided with an outside taper, as at 17, and its terminus is provided with a wedge shaped depression continuing with a threaded internal section 19.

The cells 2 are connected electrically by means of an electrical connector 20 disposed between the terminals of two adjacent cells and these are adapted for removable mounting and secure attachment to the respective terminals, and this connector comprises a bar 21 of a size to efficiently carry the electric load and this bar terminates at both ends in an annular head 22, the head having a tapered orifice 23 adapted to engage the tapered post, and the outer perimeter 24 of the upper part of this head is also tapered, this taper substantially paralleling the outer taper of the post and having less taper than that of the wedge shaped depression 18 in the terminus of the said post.

Means is now provided to secure a close electrical contact and a rigid mechanical contact of the connector 20 and post 16 to assist in maintaining a series of cells in secure assembly and close union, which means consists of a cup shaped washer 25 having a tapering rim 26 adapted to engage the tapered outer perimeter of the head, and a tapered centrally positioned wedge 27 adapted to engage the said depression 18.

A bolt 28 is now passed through an orifice 29 in the washer 25 and engages the terminal post by means of its threaded section and it is now apparent that upon tightening this bolt that there will be a simultaneous movement to expand the metal of the post, about the depression, and to contract the annular head when a very rigid union will result, and further that by the bolt head being positioned on top of and in contact with a metal washer the assembly may be readily made or broken.

In the rigid assembly of a plurality of cells of a battery in addition to the assistance rendered by securing the cells together with the electric connectors a further means of mechanical security is provided which consists of a mechanical connector 30 which comprises a bottom strap 31 and a top strap 32 secured together and about the assembled cells.

The straps have a breadth to maintain their alignment by registering with the sides of the offsets and are therefore removably registerable with the offsets or, recessed and aligned channel, whereby independent lateral movement of the cells is well nigh impossible.

Additional assistance to prevent this movement is also provided by lugs 33 as shown in Fig. 3 where the top strap 32 (see Fig. 1) is formed as a grid to avoid the inlet caps 34, with its cross pieces 35 having depending edges cut from the body of the strap and designed to fill the upper end of the adjacent connecting channel 11 for the purpose.

The bottom strap 31 (see Figs. 3 and 5) is also cut as shown to provide the lugs 33a and these lugs abut the side wall of the off-set in the manner explained for the lug 33 and for the same purpose.

The ends 36 of the bottom strap 31 are upturned and project above the case 3 to be secured to a similar but shorter upturned end 37 of the top strap 32, by a bolt 38 as shown in Fig. 3, the bolt being passed through the hole 39 for the purpose, the two ends and the bolt providing a gripping means.

Obviously certain modifications of the above arrangement can be adopted as where a bolt 40 may be passed through the connecting channels securing the top and bottom straps together intermediate their upturned ends, as shown in Fig. 4.

It is also obvious that the above mentioned gripping means may be shaped to provide a handle without affecting the invention.

In use the cells are constructed to provide a complete cell unit with the terminals adapted for ready, thorough and rigid connection with the electric connectors and with the channels provided in the case to secure the cells in assembly as a battery.

The battery is connected by assembling the cells on the bottom strap, securing the electric connectors on the respective terminals, in the manner described, then adding and securing the top strap in the manner explained when the battery is ready for its intended use.

Assuming now that a cell becomes dead, which can readily be determined by the proper measuring meter, the cell will be removed by disconnecting the electric connectors from the adjacent cell or cells and removing the top strap, then withdrawing the cell.

A new cell can then be added in the reverse manner thus to provide longer life to the battery at relatively little expense.

The cover, a fragment of which is shown in Fig. 2, is intended to be sealed to the top of the cell in any suitable manner and to prevent fumes from attacking the metal parts.

Having thus described my invention I claim:

1. In interchangeable battery cells, the combination with a detachable electrical connecting means, of vertically withdrawable cells, each cell having an encircling recess about its shortest perimeter, said recess being disposed to register with a corresponding recess of an adjacent cell to form therewith a vertically positioned connecting channel therebetween and an aligned channel positioned longitudinally of the battery, and registering with the connecting channels, and a removable securing means mounted in said aligned channel and provided with means to engage the cells in the openings of the connecting channels.

2. In interchangeable battery cells, the combination with a detachable electrical connecting means, of vertically withdrawable cells, each cell having an encircling recess about its perimeter, said recess being disposed to register, side by side, with a corresponding recess of an adjacent cell, to form therewith a vertically positioned connecting channel therebetween, and positioned on the top and bottom of said cells to provide an aligned channel registering with and intersecting the top and bottom openings respectively of the connecting channels, and providing a continuous channel about a battery of cells, and a securing means registerable with both channels at their intersections.

3. In interchangeable battery cells, the combination with a detachable electrical connecting means, of vertically withdrawable cells, each cell having an encircling recess disposed to register with the corresponding recess of an adjacent cell, to form therewith a vertically positioned channel therebetween, and providing with the bottom recess of the adjacent cell a continuous aligned channel about said battery, and a securing means consisting of a top strap and a bottom strap, said top strap being formed to provide upturned ends and to avoid the caps of said cells, and provided with lugs engageable with adjacent cells in said vertically positioned channels, and said bottom strap being formed to provide upturned ends registerable with and securable to the complemental upturned ends of the top strap, and provided with lugs engageable with adjacent cells in the bottom openings of said vertically positioned channels.

ARDIS D. GERKING.